Feb. 26, 1935.  P. LIRA  1,992,706
CINEMATOGRAPHIC MECHANISM
Filed Oct. 17, 1932   7 Sheets-Sheet 1

Fig. 1

P. Lira
INVENTOR

By: Marks & Clark
Attys

Feb. 26, 1935.                P. LIRA                1,992,706
                    CINEMATOGRAPHIC MECHANISM
                  Filed Oct. 17, 1932        7 Sheets-Sheet 2

P. Lira
INVENTOR

By Marks & Clerk

Feb. 26, 1935.  P. LIRA  1,992,706
CINEMATOGRAPHIC MECHANISM
Filed Oct. 17, 1932  7 Sheets-Sheet 3

P. Lira
INVENTOR
By Marks & Clerk
Attys.

Feb. 26, 1935.   P. LIRA   1,992,706
CINEMATOGRAPHIC MECHANISM
Filed Oct. 17, 1932   7 Sheets-Sheet 4

Feb. 26, 1935.  P. LIRA  1,992,706
CINEMATOGRAPHIC MECHANISM
Filed Oct. 17, 1932   7 Sheets-Sheet 5

P. Lira
INVENTOR

Feb. 26, 1935.　　　　　P. LIRA　　　　　1,992,706
CINEMATOGRAPHIC MECHANISM
Filed Oct. 17, 1932　　　7 Sheets-Sheet 7

P. Lira
INVENTOR
By: Marks & Clerk
Attys.

Patented Feb. 26, 1935

1,992,706

UNITED STATES PATENT OFFICE 1,992,706

CINEMATOGRAPHIC MECHANISM

Pedro Lira, Iquique, Chile

Application October 17, 1932, Serial No. 638,206

10 Claims. (Cl. 88—18)

My invention relates to a complete cinematographic mechanism to run the film from the feeding reel till the storing reel in such a way as to produce alternated stops and runs of the film as it passes by the focal plane; and the object of my invention is: first, to allow the use of unperforated cinematographic films, narrower and thinner than those perforated, saving celluloid and photographic emulsion; second, to eliminate the noise while the cine-camera or cine-projector is working, and third, to produce a perfectly steady projected picture.

I reach these objects by means of the mechanisms shown in the accompanying drawings, wherein.

Figures 4, 5 and 6 show in detail the device of the feeding-reel as follows.

Figures 7, 8 and 9 show in detail the device of the storing-reel, as follows.

Figures 10, 11, 12 and 13 show an embodiment of the oscillator which I name "parallel oscillator", as follows.

Figures 14, 15 and 16 show another embodiment of the oscillator which I name "flexible oscillator", as follows.

Figures 17, 18, 19 and 20 show the device which produces the reciprocating movement, as follows.

Figures 21 and 22 show an alternative device for the same mechanism as follows.

Figures 23, 24, 25, 26 and 27 show a device permitting a change in the gear-ratio in the cine-projector means for the transmission of movement: I call it "differential corrector"; said figures are as follows.

The same letters or numbers denote the same parts throughout the drawings.

Figure 1:
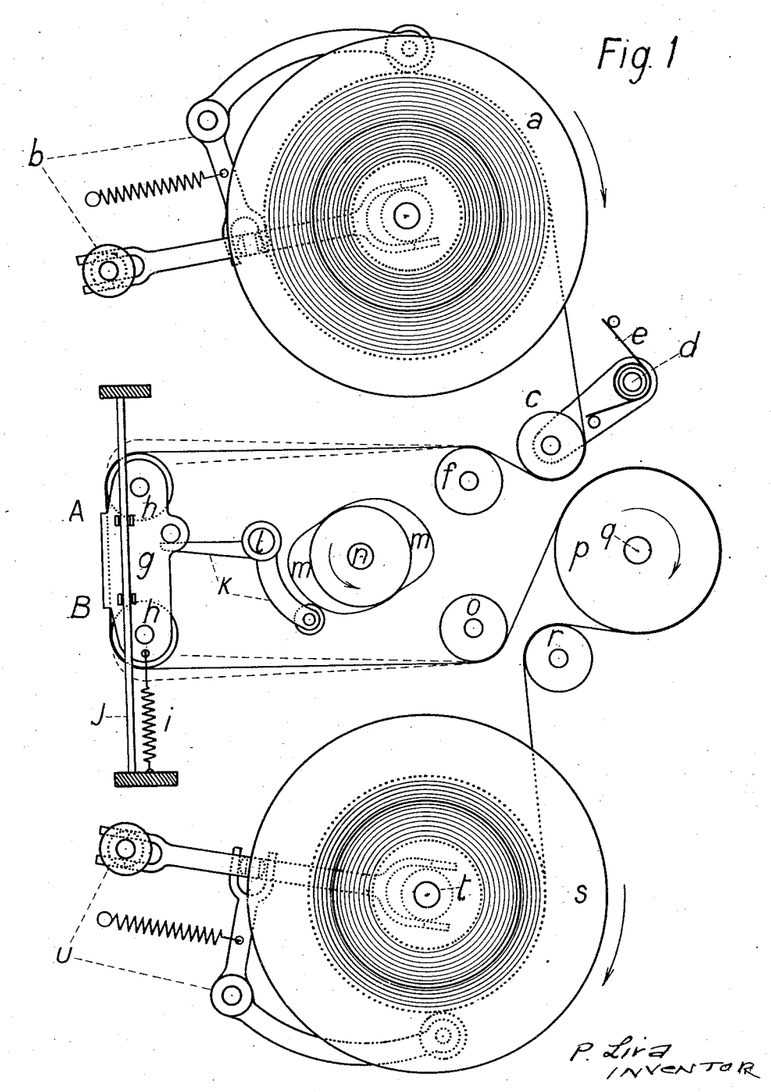
Figure 1 shows a general diagrammatic view of the mechanism for a cine-camera, without indication of the means for the transmissions of the movement.

*General description of the mechanism for a cine-camera.*—In Figure 1:

$a$ is the reel with the fresh film or "feeding reel".

$b$ is a mechanism, which will be shown afterwards in detail, and whose object is to regulate the braking of the feeding reel in such a way that this reel delivers the film with a constant tensile stress.

$c$ is a tension free roller supported by an arm free to pivot on the fixed shaft $d$ regulating the tensile stress of the film by means of the spring $e$.

$f$ is a free roller with a fixed shaft, which I will name "oscillator incoming roller".

$g$ is a small frame with rollers $h$ at its ends; this frame may be moved up or down sliding on rails $j$ whose ends are fixed to the frame of the camera.

The frame $g$ will have a reciprocating movement, so I will name it "oscillator". The front AB of the oscillator is the photographic field where the lens forms the image.

$k$ is a rocker that pivots on a fixed shaft $l$ and its object is to convey the reciprocating movement to the oscillator.

$i$ is a spring under tension normally tending to force a contact between the oscillator and the rocker.

$m$ is a cam that turns around a camshaft $n$ and produces the reciprocating movement of the rocker.

$o$ is a free roller with a fixed shaft, which I will name "oscillator outcoming roller".

$p$ is a roller fixed on the shaft $q$ whose rotation produces the movement of the film simply by adherence. I will name it "driving pulley".

$r$ is a free roller with fixed shaft.

$s$ is the reel which stores the printed film or "storing reel".

$t$ is the shaft of the storing reel which is used at the same time as a shaft to the dragging device whose action forces the storing reel to turn and wind the printed film.

$u$ is a device which will be described hereinafter in detail and whose object is to regulate the dragging force in such a way that the storing reel takes the film with a constant tensile stress.

Figure 2:
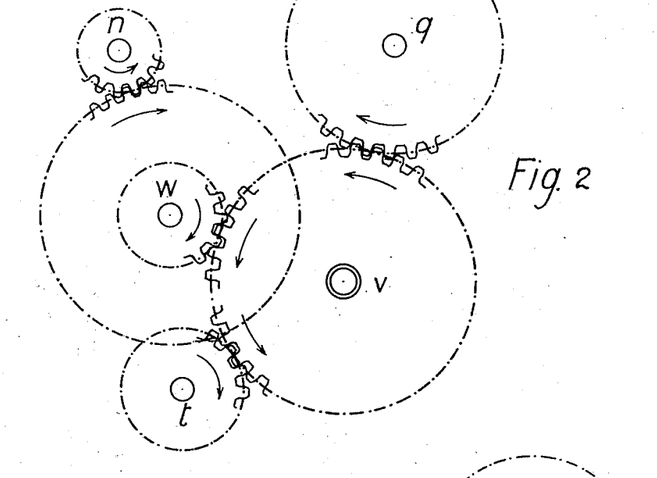
Figure 2 shows diagrammatically the transmissions of the motion corresponding to the mechanism of a cine-camera, as shown in Figure 1.

The means for the transmissions of movement in the mechanism is shown in Figure 2; and is described as follows:

The power shaft $v$ is connected by means of gears with the following shafts: first to shaft $q$ of the driving pulley; second, to shaft $t$ of the storing reel dragging mechanism, and third to the intermediate shaft $w$ which is connected to the camshaft $n$.

*Working of the mechanism.*—The film comes out of the feeding reel $a$ and runs successively through the tension roller $c$, through the oscillator incoming roller $f$, through the oscillator $g$ coming into it through the upper roller $h$, running through the photographic field AB and coming out of it through the lower roller $h$; then it runs through the oscillator outcoming roller $o$, through the main driving pulley $p$, through the free roller $r$ and finally comes into the storing reel $s$.

When the power shaft $v$ works, its movement is transmitted to the shafts $n$, $q$, $t$ by means of the gears, as it has been shown.

The dragging mechanism set up on the shaft $t$ forces the storing reel $s$ to put the film in tension so as to coil it.

At the same time the feeding reel brake $a$ resists the movement of this reel and allows travel of the film under the tensile stress for which the mechanism $b$ is set.

As a result of this the film is under tension from the feeding reel to the storing reel.

If an adequate setting of the feeding reel braking mechanism $b$ and of the regulating mechanism $u$ of the power dragging the storing reel is made, a nearly equal tensile stress of the film before and after the driving pulley $p$ can be obtained. These tensions produce the adherence of the film on the driving pulley and force the film to run in contact with the said driving pulley without slipping.

By means of the combination of mechanisms aforesaid a constant and uniform running of the film from the feeding reel to the storing reel is obtained, and this movement is exactly determined by the driving pulley, without any slipping, on account of the nearly equal tensile stress of the film at its running in and out of the said pulley.

At the same time, the shaft $n$ forces the cam $m$ to pivot and moves the rocker $k$ whose action upon the oscillator $g$ forces it into a vertical reciprocating movement.

The shape of the cam $m$ is designed in such a way that the upwards speed of the oscillator is exactly the same but opposite in direction to the relative speed with which the film is running down through it. In this way, from the composition of the film relative speed (downwards) with the oscillator dragging speed (upwards), absolute fixedness of the film in the photographic field AB in front of the lens will result during the oscillator upwards stroke.

During the oscillator downwards stroke, the uniform relative speed of the film, always downwards, is added to the oscillator speed in the same way, with the result of a rapid absolute movement of the film, which lasts till the oscillator moves upwards.

In this way successive stops and runs of the film in the photographic field are obtained, at the rate of a stop and a run per each complete reciprocating movement of the oscillator.

It must be observed that, owing to the restricted oscillation and to the convenient disposition of the oscillator incoming and outcoming rollers $f$ and $o$, the film perimeter is nearly unaltered as a result of the reciprocating movement. The small changes of this perimeter are absorbed by tension roller $c$ without any noticeable change in the film uniform tension.

*Description of the mechanism for a cine-projector.*—The device shown in Figure 1 may be equally applied to cine-projectors, changing only the emplacement of the rocker shaft $l$, the camshaft $n$ and the driving pulley $p$, so as to give way to the projecting pencil of light.

Figure 3:
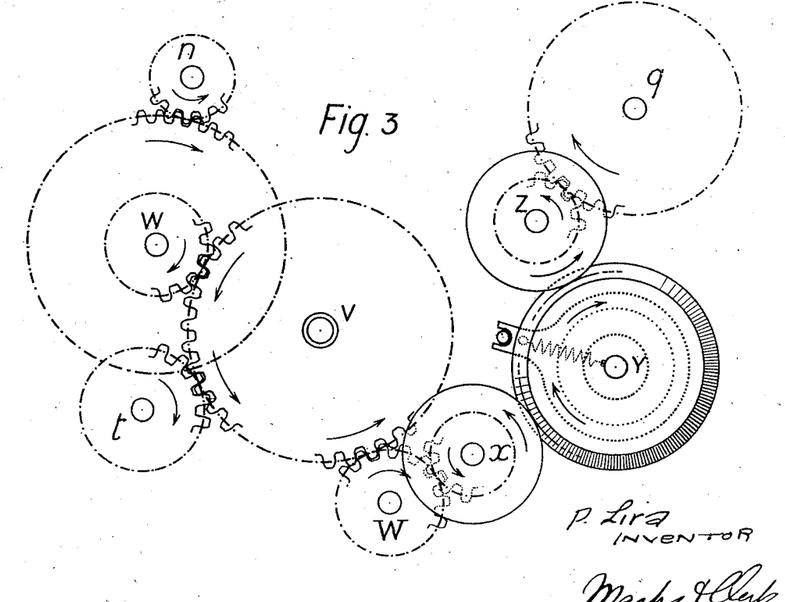
Figure 3 shows diagrammatically the transmissions of motion corresponding to a cine-projector.

The means for the transmission of movement are different for a cine-projector, as shown in Figure 3.

The power shaft $v$ moves the three following shafts by means of gears: shaft $t$ of the storing-reel; the intermediary shaft $w$ which is connected with camshaft $n$ and shaft W.

The object of shaft W is to change the rate of rotation; it is connected by means of gears to shaft $x$; this shaft is connected by means of a friction pulley to shaft $y$ which has a conic friction pulley; this friction pulley is connected by means of friction to a pulley on shaft $z$ and finally shaft $z$ is connected by means of gears to the driving pulley shaft $q$.

The assembly of shafts $x$, $y$, and $z$ forms a device which I name "differential corrector", to be described later. The object of this device is to change at will the gear ratio between power shaft $v$ and the driving pulley shaft $q$; in this way the film run may be regulated accordingly to the small possible differences in the distances between the centers of successive pictures.

The mechanism working for a cine-projector is the same as the one described for the cine-camera, save the addition of the differential corrector which is regulated by hand during the projection.

Figure 4:
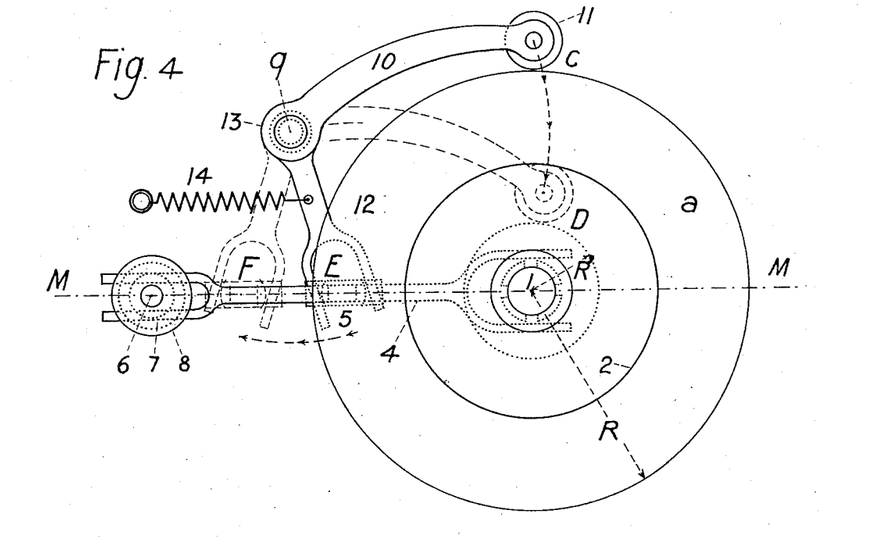
Figure 4 is a side view.
Figure 5:
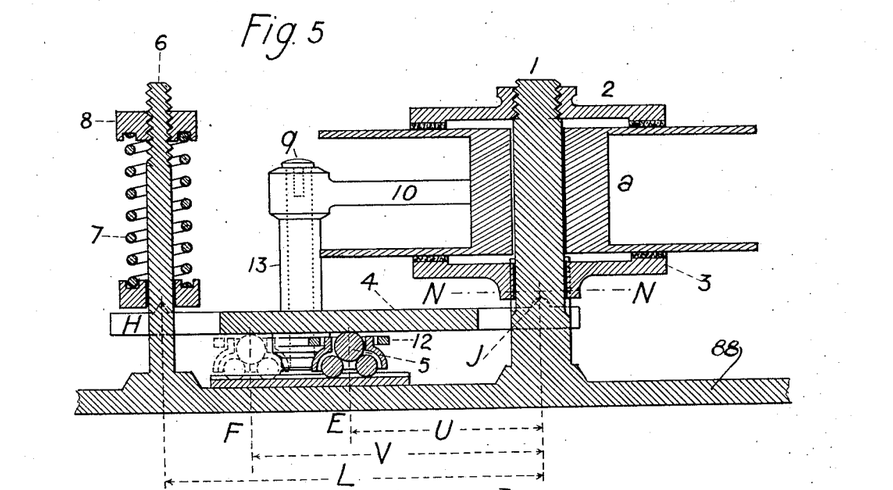
Figure 5 is a section on the line M—M of Fig. 4.
Figure 6:
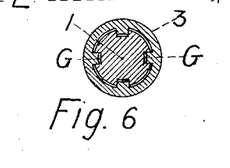
Figure 6 is a section on the line N—N of Fig. 5.

*Constant tensile stress device for the feeding reel.*—Reference is made to Figures 4, 5 and 6.

$a$ is the feeding reel which may freely revolve around shaft $l$ which is fixed to the camera body part 88.

The feeding reel is interposed between two braking discs. The outer disc 2 is screwed to shaft $l$ and remains fixed; the inner disc 3 may be moved lengthwise the shaft, but it cannot turn on account of splines engaging the grooves G shown in Figure 6 (section NN).

4 is a lever which rests on a movable support 5. This lever is pressed at its end H by the spring coil 7 and transmits this pressure at its other end $j$ to the brake disc 3 and so presses the feeding reel against the brake disc 2.

The other end of spring 7 bears against the nut 8 which is screwed on the fixed bar 6 to the camera body part 88. Screwing and unscrewing nut 8 the spring pressure may be regulated and so will be the brake action.

9 is a fixed auxiliary shaft on which a lever formed by two arms 10 and 12 connected by a tubular central section 13 may pivot.

A free roller 11 at the end of arm 10 is always pressing the remaining film roll in the feeding reel by means of spring 14.

Arm 12 ends by a fork which engages the movable support 5 of lever 4.

When the feeding reel is full roller 11 is in position C and the movable support 5 is in position E at a distance U from shaft $l$.

While the film is running out of the feeding reel, roller 11 changes from position C to position D, so the fork arm 12 drags the movable support 5 from position E towards position F. Owing to this movement the relation between the two arms in which the lever 4 is divided by support 5 changes, and this change lessens the brake pressure while the film runs out of the feeding reel.

This gradual lessening of brake pressure grants a nearly constant film tension during the unrolling of the reel, if convenient dimensions of the mechanism are adopted.

I will name R the radius of the feeding reel, R' the radius of this reel core, L the lever length and U and V the distances from E and F to the center of shaft $l$.

If the mechanism is built in such a way that the named dimensions be in the relation:

$$RU(L-V) = R'V(L-U)$$

an equality between the film tensions at the initial moment (when roller 11 is at C) and at the final moment (when the said roller is at D) will be secured.

Besides, in the intermediary positions of roller 11, namely during the unrolling of the reel, the film tensions will be kept nearly exactly constant.

Figure 7:
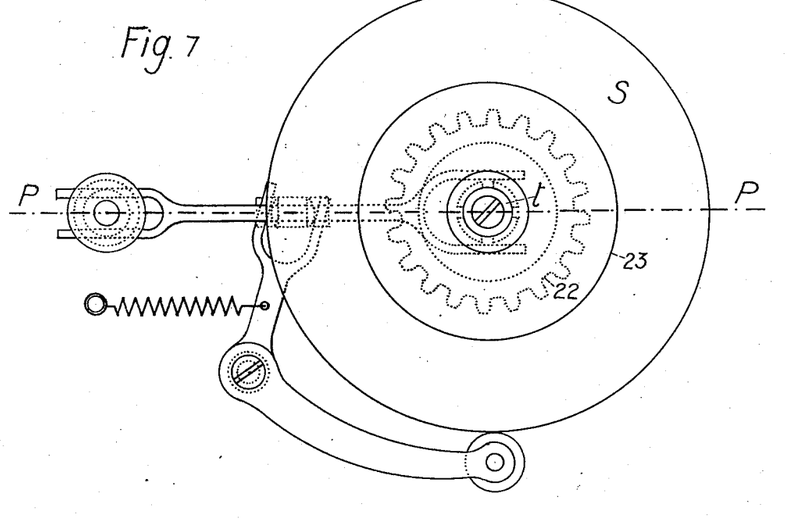
Figure 7 is a side view.
Figure 8:
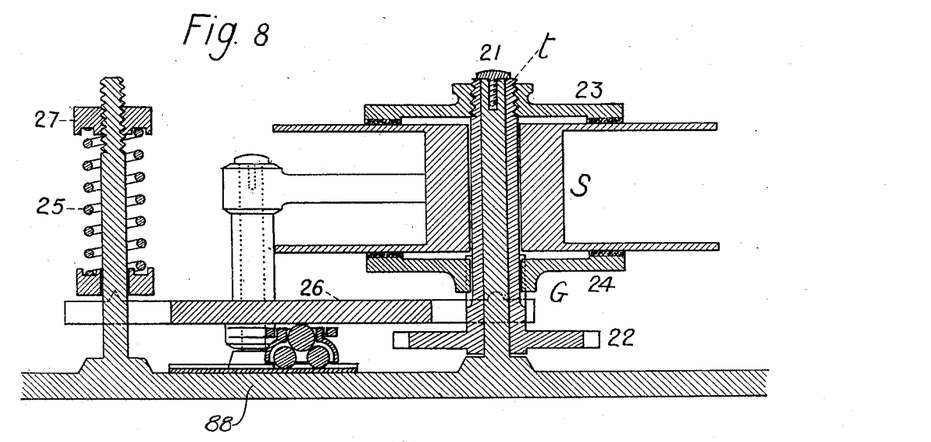
Figure 8 is a section on the line P—P of Fig. 7
Figure 9:
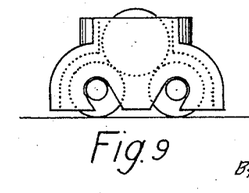
Figure 9 is an enlarged view of the movable support of the lever.

*Constant tension mechanism of the storing reel.*—This device works on the same principle as the one described for the feeding reel and is similar to it. Its only difference consists in the disposition of the disc shoes, which is made in such a way that they drag the reel instead of braking it. Reference is made to Figs. 7, 8 and 9.

21 is a shaft fixed to the camera body surrounded by the tubular shaft $t$ with gear 22 affixed to it. On this tubular shaft are the disc shoes 23 and 24. The outer disc 23 is screwed on shaft $t$ and affixed to it; disc 24 may slide along shaft $t$ but cannot turn round on account of grooves G.

The spring 25 action on lever 26 forces it to press disc 24 against the storing reel $s$; so that this reel is clamped between the discs 23 and 24.

When the power shaft moves and acts on gear 22 the tubular shaft $t$ turns round the fixed shaft 21, and the discs 23 and 24 turn with shaft $t$ dragging the reel $s$ by means of the frictional engagement between the shoes 23 and 24, and the sides of the reel.

The gear 22 ratio is such that shaft $t$ turns always more rapidly than necessary to coil the film at the rate allowed by the driving pulley, in such a way that there is a constant slipping between the storing reel and the discs which hold it.

During the running, the frictional engagement of the shoes 23 and 24 with the reel $s$ is regulated by pressure of the lever 26 on disc 24, and so the film tension is regulated, and is kept practically uniform by the displacement of the movable support during the film coiling.

The spring power is regulated by means of the nut 27 in order that the tensile stress produced by the dragging mechanism on the film be the same as produced by the braking mechanism on the feeding reel; in this way, the same film tensile stress is obtained in and out of the driving pulley.

Figure 10:
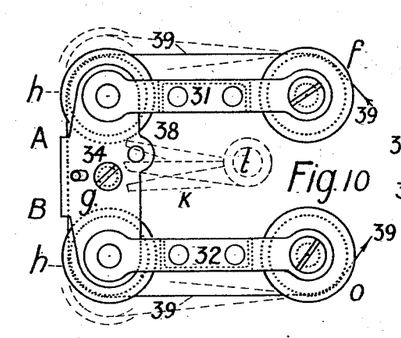
Figure 10 is a side view.

*Parallel oscillator.*—This is a model of oscillator in which the rails $j$ have been changed for connecting rods (Figure 10). The main quality of this oscillator is that there are no changes as a consequence of the reciprocating movement in the length of the path taken by the film and so there are no variations of tensile stress in the film.

Reference is made to Figures 10, 11, 12 and 13 for the parallel oscillator description.

$f$ is an incoming free roller to the oscillator and $o$ is its outcoming roller.

$g$ is the oscillator frame which has at its upper and lower ends the free rollers $h$ whose diameter must be the same as the rollers $f$ and $o$.

The upper roller $h$ shaft is connected to roller $f$ fixed shaft shaft by means of the connecting rods 31 which are bound to each other by the rigid frame 33.

The lower roller $h$ shaft is connected to roller $o$ fixed shaft by means of connecting rods 32, which are bound to each other by a rigid frame, similar as 33.

Both sides of oscillator $g$ frame are connected by a transverse screw 34, and by a transversal bar 38 on which acts rocker arm $k$ whose shaft is in $l$.

Figure 11:
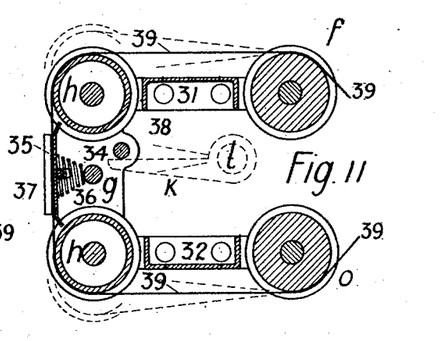
Figure 11 is a section on Q—Q of Fig. 12.
Figure 12:
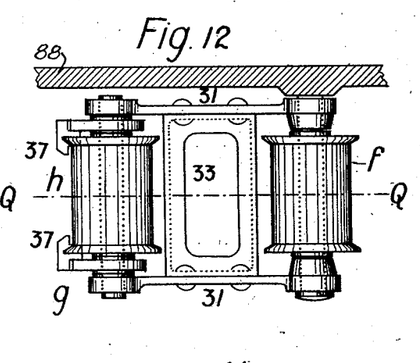
Figure 12 is a plan view and Figure 13 is a front elevation.
Figure 13:
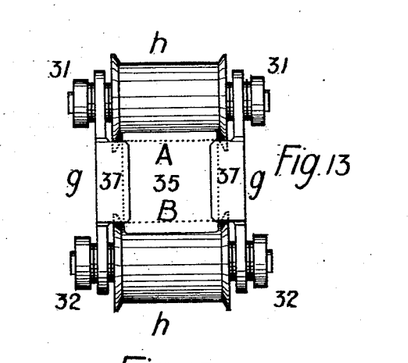

In this way the whole of the oscillator has the form of a changeable parallelogram; the four rollers $f$, $h$, $h$ and $o$ are at the angles of the said parallelogram, whose frontal side $g$ will move up and down as shown in the Figures 10 and 11.

The film enters the oscillator through the free roller $f$ and passes successively through the upper roller $h$, along the photographic field AB, and through the lower roller $h$, finally emerging through the free roller $o$.

When the film runs along the photographic field AB, it keeps perfectly flat owing to a metallic plate 35 pushed by a small spring 36, which lightly presses the film against the projections 37 on the oscillator frame $g$ at both sides of the photographic field.

Parts 35, 36 and 37 are omitted in oscillators for cine-projectors, to allow the passage of the light pencil. On cine-projectors oscillators the film is kep flat between both rollers $h$ simply by tension.

Figures 14, 15, 16:
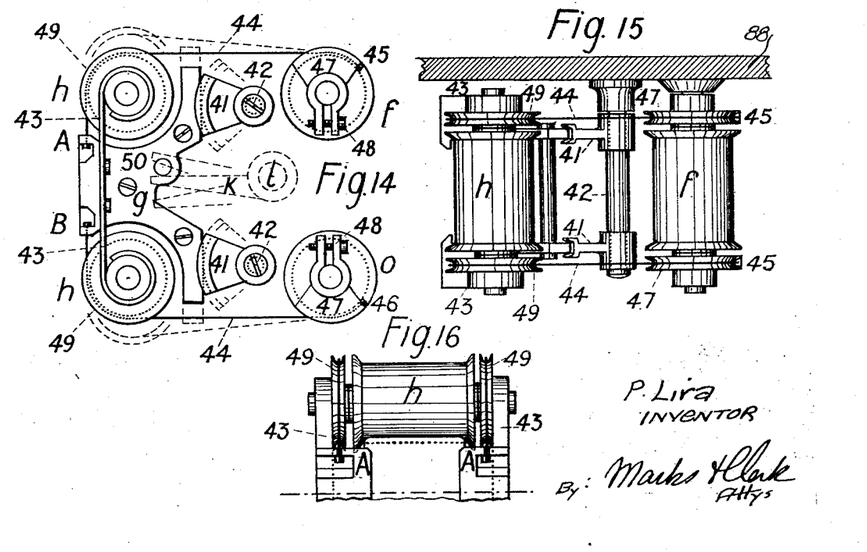
Figure 14 shows a side view.
Figure 15 is an upper view and Figure 16 is a partial front view.

*Flexible oscillator.*—The main characteristic of this oscillator is that, notwithstanding its small size, it allows wider oscillations; thus having advantages over the parallel oscillator when used on cine-cameras intended for rather big pictures.

Reference is made to Figures 14, 15 and 16 for the description of this oscillator modification.

$f$ is the oscillator incoming free roller and $o$ is the oscillator outcoming free roller.

$g$ is the oscillator frame, at whose upper and lower ends are the free rollers $h$.

The frame $g$ has projecting arms resting on free sectors 41; which are free to pivot on shafts 42 fixed on the camera body. The said free sectors 41 are provided in this modification instead of rails $j$ (Figure 1) allowing a softer and more noiseless movement.

Both sides of the frame $g$ are connected by transversal screws and by a bar 50 on which acts the rocker arm $k$ set up on the rocker shaft $l$.

Rollers $h$ shafts rest on bearings connected to frame $g$ by means of flexible flat springs 43.

Inextensible wires 44 start from points A and B of the oscillator, and run through grooved pulleys 49 which are fixed on the rollers $h$ bearings; and through grooved sectors 47 fixed on rollers $f$ and $o$ shafts by means of screws 48.

The oscillator upper part wires 44 have one end anchored at A and the other end at 45 on the upper sectors 47.

The oscillator lower part wires 44 have one end anchored at B and the other end at 46 on the lower sectors 47.

Rollers $h$ position is thus fixed by the opposing action of springs 43 and inextensible wires 44.

The film path through the oscillator is as follows: the film comes into the oscillator through roller $f$ and runs successively through the upper roller $h$, the photographic field AB, and the lower roller $h$, to emerge from the oscillator through roller $o$. The identical path of the film is always maintained by the inextensible wires 44 and by part AB of the oscillator frame from point 45 of the oscillator entrance to point 46 of the oscillator exit.

When the oscillator works, springs 43 bend during the reciprocating movements under the action of the inextensible wires 44 and the film length in the oscillator is always constant from the entrance point 45 to the emerging point 46; owing to this, the reciprocating movement does not change the film tension.

It must be marked that when parallel oscillator or flexible oscillator are used, the tension roller c (Figure 1) may be replaced by a fixed shaft roller.

It must also be marked that when the power shaft speed is uniform, the film relative speed with regard to frame g of the oscillator is also uniform, either with the parallel or the flexible oscillator.

*Mechanism producer for reciprocating movement.*—The object of this device is to produce the reciprocating movement allowing for its regulation, in such a way that in its upwards stroke the speed is exactly the same as the film relative speed, but in the opposite direction, with the object of producing absolute fixedness.

Reference is made to Figures 17, 18, 19 and 20.

Figures 17, 18, 19, 20:
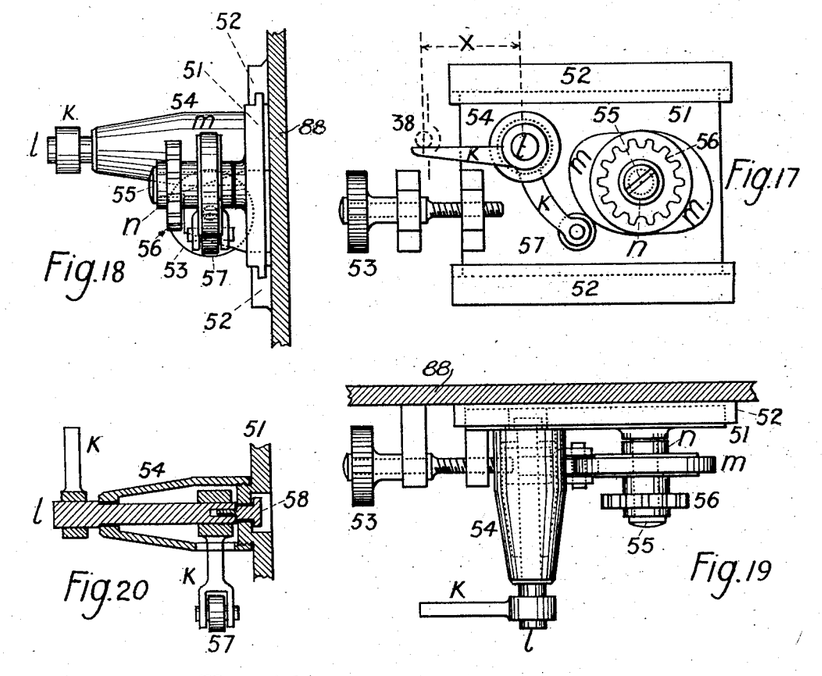
Figure 17 is a side view.
Figure 18 is a rear view.
Figure 19 is an upper view and Figure 20 is a section of the rocker shaft and its bearing.

51 is a support frame that may slide on grooves 52; this movement may be exactly regulated by means of the regulation screw 53.

The bearing 54 of rocker shaft l and shaft 55 are fixed on support frame 51.

The tubular camshaft n revolves on shaft 55; this camshaft carries the cams m and gear 56 which moves through gear transmission.

Rocket shaft l keeps its position on support 54 by means of screw 58 and the rocker arm connected with the cam, ends by a free roller 57.

Distance X between rocker shaft l and the oscillator bar 38 may be changed by means of the regulation screw 53; the variation of distance X changes the stroke length of the oscillator and therefore the reciprocating movement speed, allowing to set this speed so as to be exactly the same as the film relative speed, in order to produce absolute stops of the film on the photographic field.

Figure 21:
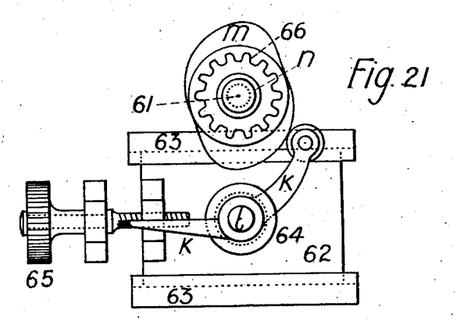
Figure 21 is a side view and Figure 22 is a rear view.
Figure 22:
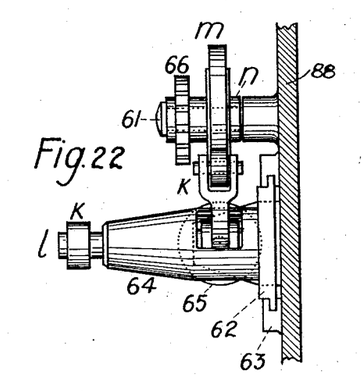

Figures 21 and 22 refer to an alternative modification of this mechanism as follows:

Shaft 61 which supports the tubular cam shaft n is fixed on the camera body part 88.

The supporting frame 62 which may slide on grooves 63 by means of the regulating screw 65, supports only bearing 64 of the rocker shaft l.

When supporting frame 62 is at its intermediate position the line between the shafts l and 61 centers must be in a right angle with rocker arm k connected to the oscillator.

The regulation is accomplished by means of screw 65 in the same way as described before.

*Differential corrector.*—This device is only required for cine-projectors and its object is to allow small and exact changes of the gear ratio between the power shaft v and the driving pulley shaft q, allowing in this way the adjustment of the film advance by oscillation, namely from stop to stop.

Figure 23:
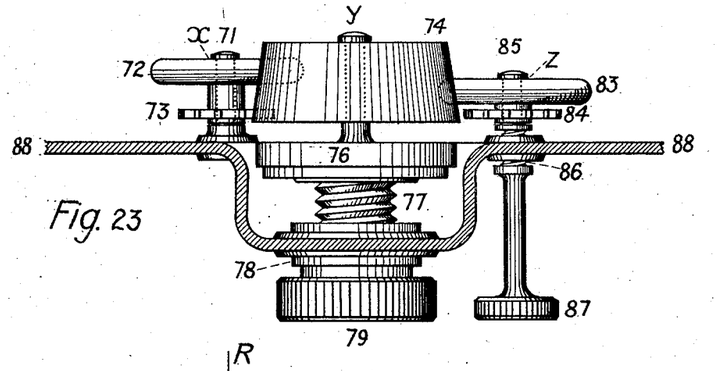
Figure 23 is a back view.
Figures 24, 25, 26, 27:
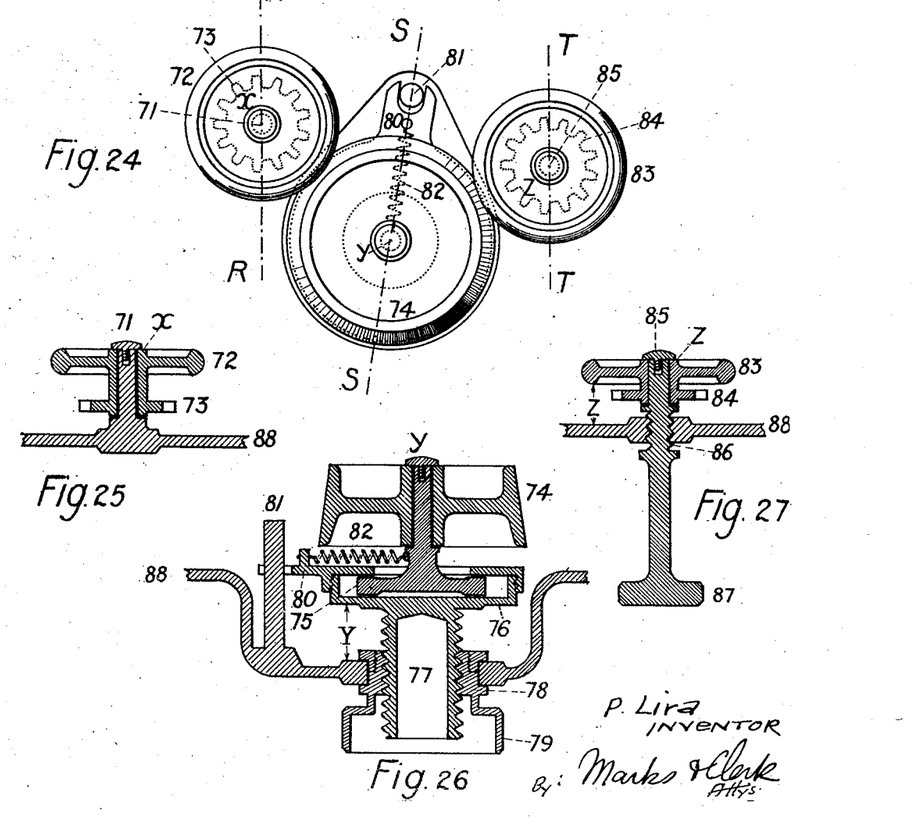
Figure 24 is a side view.
Figures 25, 26 and 27 are sectional views on the lines R—R, S—S and T—T, respectively, of Figure 24.

For the description of the differential corrector reference is made to Figures 23, 24, 25, 26 and 27.

x is a transmission tubular shaft with a friction pulley 72 and a gear 73, which moves by means of transmission as shown in Figure 3.

Shaft x may turn freely around shaft 71 which is fixed to the camera body part 88.

y is a shaft supporting a friction cone pulley 74 which may turn freely and transmits the movement from pulley 72 to pulley 83.

Shaft y ends in a disc shaped foot 75 which is enclosed in a box 76 in such a way that the said shaft may slide sideways.

Box 76 has on its under side a tubular screw 77 threaded into a headed nut 78, which may be turned by means of handle drum 79.

Box 76 has also a projecting arm 80 ended by a fork which engages the fixed lug 81.

When nut 78 is turned by hand, screw 77 slides without turning, owing to lug 81 which holds the arm 80 of box 76. In this way box 76 slides with shaft y, and distance Y is changed.

z is a transmission hollow shaft which carries a friction pulley 83 and a gear 84 acting on the driving pulley gear.

The hollow shaft z revolves freely on shaft 85 which extends through the camera body part 88 in the form of a screw 86 outwardly ended by a head 87 turned by hand.

Turning screw 86 by means of the head 87, shaft 85 slides longitudinally, carrying hollow shaft z and changing the distance Z.

The central conic pulley 74 is always pressed against pulleys 72 and 83 by means of spring 82 which has an end connected to shaft y and the other end fixed to pin 80.

When the power shaft moves, its movement is transmitted to shaft x through gear 73, as shown in Figure 3.

Shaft x moves the conic pulley 74 through the friction pulley 72 and its movement is transmitted to the pulley 83 of shaft z, which finally transmits the movement to the driving pulley shaft through gear 84.

The change of gear ratio is accomplished by changing distances Z and Y by means of the manipulating heads 87 and 79.

If distance Z is increased the friction pulley 83 comes into contact with a narrower part of the conic pulley 74 and so the gear ratio lessens.

If distance Y is increased the friction pulleys 72 and 83 come into contact with a wider part of the conic pulley 74, so the gear ratio between pulleys 72 and the conic pulleys 74 is lessened, but at the same time the gear ratio between pulley 74 and pulley 83 increases, although not in the same amount, therefore a differential change of the resulting gear ratio is produced, which allows a very exact adjustment.

It must be especially marked that the friction pulleys 72 and 83 must be adjusted to positions at different distances from the support 88 or camera body part, and this differential adjustment must be substantial to obtain the required differential effect.

The adjustment of the film advance by oscillation is done by means of the differential corrector during the projection, first by providing an approximate adjustment by means of the manipulating head 87, and then an exact one by means of the manipulating head 79.

Having thus described my invention, what I claim as new, and desire to secure by Letters Patent, is:

1. In a device of the class described, the combination with reels for supplying and storing a film and a camera body part providing a mounting for said reels, means for effecting the intermittent movement of the film sections across the field of a lens, said means comprising a reciprocating film-carrier allowing the film to run all its way in tension from the feeding-reel up to the storing-reel, means comprising a cam-shaft for producing a reciprocating movement of said film-carrier, means for braking the feeding-reel, and means for dragging the storing-reel, a shaft having a plain pulley thereon, over which pulley the film passes on its way from the feeding-reel to the storing-reel, and against which pulley the film is pressed by its proper tension only, bearings fixed to the camera body part for supporting said shaft, means for gearing said shaft with the cam-shaft and with the storing-reel dragging means, whereby said mechanisms are operated together, means for regulating the braking action over the feeding-reel so that said reel supplies the film at a nearly constant tension, and means for regulating the dragging means action over the storing-reel so that said reel coils the film at a nearly constant tension.

2. In a device of the class described, the combination with reels for supplying and storing a film and a camera body part providing a mounting for said reels, means for effecting the intermittent movement of the film sections across the field of a lens, said means comprising a reciprocating film-carrier allowing the film to run all its way in tension from the feeding-reel up to the storing reel, means including a cam-shaft for producing the reciprocating movement of the film-carrier, a friction brake acting over an feeding-reel, means for supplying the force to operate said brake, means for dragging by friction the storing-reel, and means for supplying the force producing the friction in said dragging means, of a shaft having a pulley thereon, over which pulley the film passes on its way from the feeding-reel to the storing-reel, and against which pulley the film is pressed on account of its proper tension only, bearings fixed to the camera body part for supporting said shaft, means for gearing said shaft with the cam-shaft and with the storing-reel dragging means, whereby said mechanisms are operated together, means for correlating the force of friction in the brake acting over the feeding-reel with the diameter of the coil of film in said reel, so that said force decreases when said diameter decreases, and means for correlating the force of friction in the dragging means acting over the storing-reel with the diameter of the coil of film in said reel, so that said force increases when said diameter increases.

3. In a device of the class described, the combination with reels for supplying and storing a film and a camera body part providing a mounting for said reels, means for running the film from the feeding-reel through the mechanism to the storing-reel, a friction brake acting over the feeding-reel, and means comprising a spring for supplying the force working said brake, of a lever receiving in a fixed point of it the action of said spring and in another fixed point of it exerting the pressure over said brake, whereby said lever acts as an intermediary element between the force working the brake and the brake itself, a movable fulcrum for said lever, means for guiding said movable fulcrum so that its movement is along the lever, thereby allowing a change in the leverage of both the force of the spring and the pressure exerted over said brake, an angle-lever in contact at one of its ends with the coil of film in the feeding-reel and connected at its other end to the said movable fulcrum of the lever, means fixed to the camera body part for supporting said angle-lever, and means for acting over said angle-lever so as to keep it in contact with the coil of film, whereby when the diameter of said coil decreases, said angle-lever and the movable fulcrum connected with it moves, the leverage of the force working the brake changes, and the pressure exerted over said brake decreases.

4. In a device as described, the combination with reels for supplying and storing a film and a camera body part providing a mounting for said reels, means for running the film from the feeding-reel through the mechanism to the storing-reel, means for dragging by friction the storing-reel, means for gearing said means for dragging the storing reel with said means for running the film whereby said mechanisms are operated together, and means for supplying the force producing the friction in said dragging means, of a lever receiving in a fixed point of it the action of said spring and in another fixed point of it exerting pressure over said dragging means so as to generate the dragging force of friction when the mechanism is operated, whereby said lever acts as an intermediary element between the spring and the said dragging means, a movable fulcrum for said lever, means for guiding said movable fulcrum so that its movement is along the lever, thereby allowing a change of the leverage of both the force of the spring and the pressure exerted over said dragging means, an angle-lever in contact at one of its ends with the coil of film in the storing-reel and connected at its other end to the said movable fulcrum, means fixed to the camera body part for supporting said angle-lever, and means for acting over said angle-lever so as to keep it in contact with the coil of film, whereby when the diameter of said coil increases, said angle-lever and the movable fulcrum connected with it moves, the leverage of the force of the spring changes, and the pressure exerted over said dragging means increases.

5. In a device as described, the combination with reels for supplying and storing a film and a camera body part providing a mounting for said reels, means for running the film from the feeding-reel through the mechanism to the storing-reel, a reciprocating film-carrier having two parallel free-rollers over which the film passes when passing to and from the field of a lens, and means for producing the reciprocating movement of said film-carrier, of a free-roller over which the film passes when passing to the reciprocating film-carrier, a free-roller over which the film passes when passing from the film-carrier, bearings fixed to the camera body part for supporting said two free-rollers, said bearings being so arranged that the axes of said two free-rollers are parallels to the free-rollers axes in the reciprocating film-carrier, the distance between the axes of said two free-rollers and the diameter of them being so proportioned that the portions of film comprised between them and the free-rollers in the reciprocating film-carrier are substantially parallels, bearings for supporting the shafts of the free-rollers in the reciprocating film-carrier, flexible springs for connecting said bearings with the central frame of the reciprocating film-carrier, means for guiding said central frame in its reciprocating movement, inextensible means arranged at both sides of the film path for connecting said central frame with fixed points in the camera body, said fixed points being set on both sides of the film path before it leaves the first of the two free-rollers with fixed axis and after it enters over the second one of them, and means for compelling the aforesaid means to run by the sides of the film and along its path from the reciprocating film-carrier frame up to the aforesaid fixed points, said means comprising supports fixed to said bearings of the reciprocating film-carrier rollers, so when the film-carrier reciprocates, the springs connecting said bearings with the frame of said film-carrier bends at intervals under the action of said means, whereby the length of the film-path is kept unchanged when the film-carrier reciprocates.

6. In a device as described, the combination with reels for supplying and storing a film, means for running the film from the feeding-reel through the mechanism up to the storing-reel, a reciprocating film-carrier over which the film passes when passing across the field of a lens, and means comprising a shaft having a cam thereon for producing the reciprocating movement of said film-carrier, of a rocker-shaft having a rocker thereon, said rocker being in contact at one of its ends with the aforesaid cam and at its other end with the aforesaid reciprocating film-carrier, whereby said rocker is an intermediary element between the cam and the reciprocating film-carrier means for supporting said rocker shaft, a bar fitted in the reciprocating film-carrier for receiving the action of said rocker, and means for adjusting the distance between the rocker-shaft and the reciprocating film-carrier, thereby allowing the adjusting of the amplitude of said film-carrier reciprocating movement.

7. In a device as described, the combination with reels for supplying and storing a film, means for running the film from the feeding-reel through the mechanism up to the storing-reel, a reciprocating film-carrier over which the film passes when passing across the field of a lens, and means comprising a shaft having a cam thereon for producing the reciprocating movement of said film-carrier, a rocker-shaft having a rocker thereon, said rocker being in contact at one of its ends with the aforesaid cam and at its other end with the aforesaid reciprocating film-carrier, whereby said rocker acts as an intermediary element between the cam and the reciprocating film-carrier, a bar fitted in the reciprocating film-carrier for receiving the action of said rocker, a movable support holding both the cam-shaft and the rocker-shaft bearings, means for bearing said movable support in connection with the camera body, and means for moving said support so as to adjust the distance between the rocker shaft and the reciprocating film-carrier, thereby allowing adjustment of the amplitude of said film-carrier reciprocating movement.

8. In a device as described, the combination with reels for supplying and storing a film, means for running the film from the feeding-reel through the mechanism to the storing reel, a reciprocating film-carrier over which the film passes when passing across the field of a lens, and means comprising a shaft having a cam thereon for producing the reciprocating movement of said film-carrier, a rocker-shaft having a rocker thereon, said rocker being in contact at one of its ends with the aforesaid cam and at its other end with the aforesaid reciprocating film-carrier, whereby said rocker acts as an intermediary element between the cam and the reciprocating film-carrier, means fitted in the reciprocating film-carrier for receiving the action of said rocker, a movable support holding the rocker-shaft bearings, means for guiding the movement of said support so that it moves in a substantially perpendicular direction, to the plane determined by the axes of both the cam-shaft and the rocker shaft, and means for moving said support so as to adjust the distance between the rocker-shaft and the reciprocating film-carrier, thereby allowing the adjustment of the amplitude of said film-carrier reciprocating movement.

9. In a device as described, the combination with reels for supplying and storing a film and a camera body part providing a mounting for said reels, means for running the film from the feeding-reel through the mechanism up to the storing-reel, said means comprising a shaft having a pulley thereon to drive the film, a reciprocating film-carrier over which the film passes when passing across the field of a lens, and means comprising a cam-shaft for producing the reciprocating movement of said film-carrier, a transmission shaft geared to the aforesaid cam-shaft, means for gearing said shafts, a narrow friction wheel mounted upon said transmission shaft, a transmission shaft geared to the aforesaid film-driving pulley shaft, means for gearing said shafts, a narrow friction wheel mounted upon said second transmission shaft, the aforesaid two friction wheels being set in parallel planes and one of them being shiftable along its axis, means for shifting said shiftable friction wheel, means for supporting said two transmission shafts in connection with the camera body, said means being so arranged that the axes of said transmission shafts are parallel, a shaft parallel to the aforesaid transmission shafts, means for supporting said shaft in connection with the camera body part, a conic friction wheel mounted on said shaft and free to revolve around its axis, said conic friction wheel being shiftable along its axis, means for shifting said conic friction wheel along its axis, and means for keeping said conic friction wheel pressed against the aforesaid two narrow friction wheels so as to secure friction gearing with them, whereby said conic friction wheel acts as an intermediary element of gearing transmission between said narrow friction wheels.

10. In a device as described, the combination with reels for supplying and storing a film and a camera body part providing a mounting for said reels, means for running the film from the feeding-reel through the mechanism to the storing-reel, said means comprising a shaft having a pulley thereon to drive the film, a reciprocating film-carrier over which the film passes when passing across the field of a lens, and means comprising a cam-shaft for producing the reciprocating movement of said film-carrier, a transmission shaft geared to the aforesaid cam-shaft, means for gearing said shafts, a narrow friction wheel mounted upon said transmission shaft, a transmission shaft geared to the aforesaid film driving pulley shaft, means for gearing said shafts, a narrow friction wheel mounted upon said second transmission shaft, bearings fixed to the camera body part for supporting said two transmission shafts, a shaft parallel to said transmission shafts, a conic friction wheel mounted on said shaft and free to revolve around its axis, a flat foot holding said shaft, an encasement including said flat foot and allowing its free movement in a plan perpendicular to said shaft, means for supporting said encasement in connection with the camera body part, said means allowing the movement of said encasement in the axial direction of said shaft, means for moving said encasement, and means acting over said shaft so as to press the aforesaid conic friction wheel against the two aforesaid narrow friction wheels, whereby said conic friction wheel acts as an intermediary element of gearing transmission between said two narrow friction wheels.

PEDRO LIRA.